April 26, 1966  A. J. ANDERSON  3,248,153
CONTINUOUS PROCESS FOR MANUFACTURING OF PAINT BRUSHES
Original Filed June 18, 1962
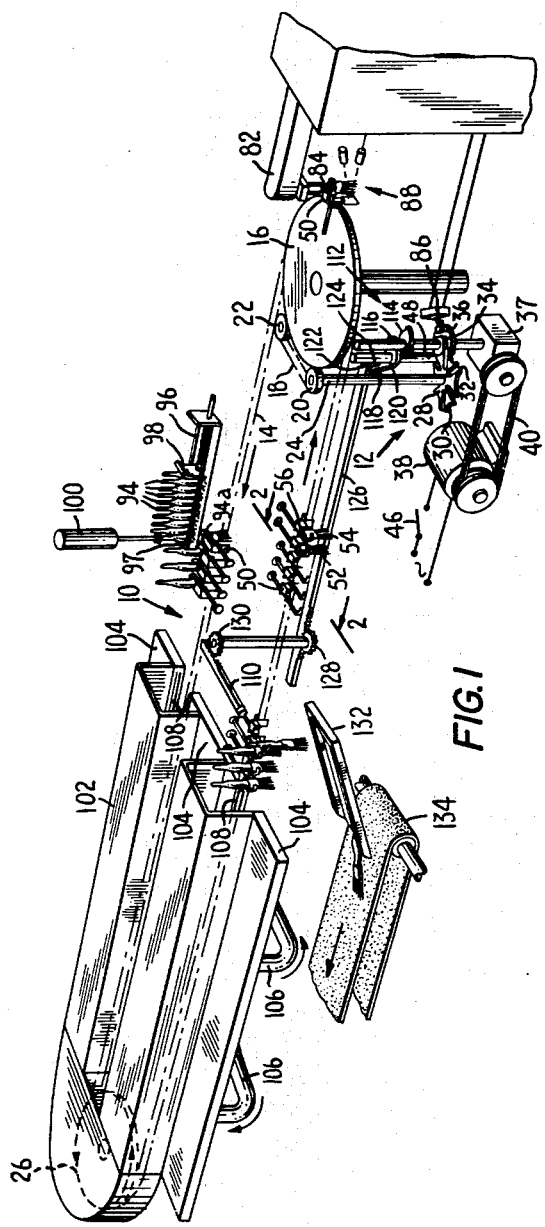
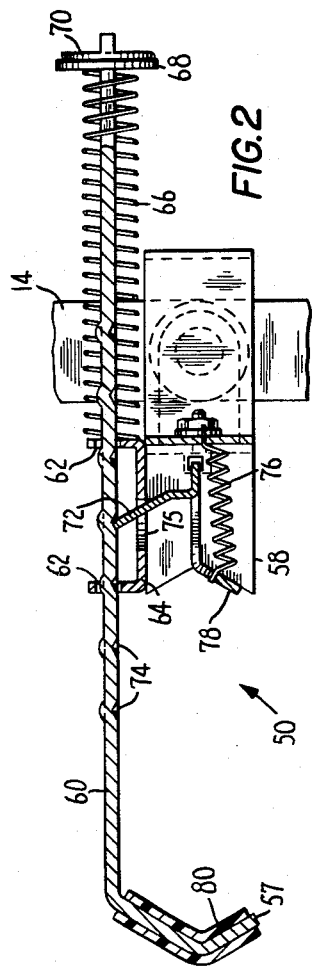
INVENTOR.
ALFRED J. ANDERSON
BY Eyre, Mann & Lucas
ATTORNEYS 3,248,153
CONTINUOUS PROCESS FOR MANUFACTURING OF PAINT BRUSHES
Alfred J. Anderson, Livingston, N.J., assignor to H. V. Hardman Company, Inc., a corporation of New Jersey
Original application June 18, 1962, Ser. No. 203,117, now Patent No. 3,154,346, dated Oct. 27, 1964. Divided and this application Dec. 30, 1963, Ser. No. 345,548
6 Claims. (Cl. 300—21)

This application is a division of my copending application Serial No. 203,117, filed June 18, 1962, now U.S. Patent No. 3,154,346, issued October 27, 1964 and titled "Apparatus for Manufacture of Paint Brushes."

The present invention relates to a continuous process for the manufacture of paint brushes.

In accordance with the present invention bristles are sized out in a ferrule in conventional manner and then the ferrule with the bristles therein are continuously loaded on a conveyor which carries the ferrules through a first station where a measured amount of liquid cement is automatically injected into the ferrule to form a pool on top of the bristle knot in the ferrule. After this is done the ferrules are automatically conveyed through a second station where handles are inserted in the top of the ferrule and pushed down into the pool of cement. The brush assembly is then conveyed through a third station where the cement is cured and hardened to complete the brush which is thereafter automatically discharged from the conveyor ready to be packaged and shipped.

In the continuous process of the present invention many operations heretofore carried out by hand are automatically performed which greatly speeds up production and reduces manufacturing costs. It only takes about fifteen minutes to produce a finished brush and thirty brushes have been made in one minute in a preferred form of apparatus illustrated in the drawings. Distribution of the cement employed for anchoring the handle and bristle knot in the ferrule is automatically controlled to insure a uniform product of optimum strength.

Other advantages and the details of the continuous process of the present invention are best understood by reference to the preferred form of apparatus illustrated in the drawings in which:

FIG. 1 is a schematic presentation of a preferred form of equipment which may be utilized to carry out the process of the present invention.

FIG. 2 is a section taken along line 2—2 of FIG. 1.

In the drawings, a conveyor 10 is preferably driven by an intermittent drive mechanism 12. The conveyor is a continuous link chain 14 which is stretched around two horizontally disposed sprockets with gear teeth that mesh with the links of the chain 14. The teeth on one of the sprockets hereinafter referred to as the conveyor drive sprocket 16 also mesh with a second continuous link chain 18. This second chain is stretched around two more horizontally disposed sprockets 20 and 22, one of which is driven by the output shaft 24 of the intermittent drive mechanism 12. The other conveyor sprocket 26 is an idler sprocket which rotates freely with the link chain 14 as the chain moves around it. Therefore, as the output shaft 24 of the intermittent drive mechanism 12 moves its motion is transmitted to the conveyor drive sprocket 16 by the second continuous link chain 18. The drive sprocket, in turn, transmits the motion to the conveyor link chain 14 which then moves around the conveyor drive and idler sprockets 16 and 26 with the motion of the intermittent drive mechanism 12.

The intermittent drive mechanism 12 includes a geneva type movement with a star wheel 28 which is coupled to the output shaft 24 and provided with a number of arcuate concavities 30 separated by radial slots 32. Motion of the star wheel 28 is controlled by a crescent shaped stop 34 and an indexing pin 36 driven by the output of a reduction gear box 37. The gear box in turn is driven by electric motor 38 which transmits power to the gear box 37 through a belt drive 40.

A switch 46 is connected in series between the A.C. lines and the motor 38 to stop and start the motor. When switch 46 is closed the electric motor 38 drives gear box 37 which transmits the motion to the crescent shaped stop 34 so that the convex surface 48 of the stop slides in one of the concavities 30 of the star wheel 28. As a result the output shaft 24 of the drive mechanism is held stationary. The shaft 24 remains stationary until the stop 34 rotates out of the concavity 30 and the index pin 36 moves into one of the slots 32 whereupon the pin moves the star wheel 28 by exerting pressure on the side wall of the slots. The movement of the star wheel continues until the pin 36 leaves the slot 32 whereupon the convex surface 48 of the stop 34 enters another of the concavities 30 of the star wheel 28 to hold it stationary. Therefore, the geneva movement moves the shaft 24 with a stop motion as the motor 38 rotates. The shaft is stationary while the convex surface 48 slides in the arcuate concavities 30 and rotates as the indexing pin 36 moves in the radial slots 32. This stop motion is transmitted by conveyor drive sprocket 16 to the conveyor chain 14 so that the conveyor chain moves around the conveyor sprockets 16 and 26 with alternating periods of rest and motion. These periods are arranged in a two second cycle with the conveyor chain 14 remaining stationary two thirds of the time and moving for one third of the time. While the form of conveyor illustrated in the drawings gives best results it will be understood that conventional forms of conveyors may also be employed in carrying out the process of the present invention.

Extending out from the conveyor at fixed intervals around the continuous chain 14 are a number of clamps 50. These clamps are adapted to grasp the exterior surface of the ferrules 52 so that the bristles 54 hang freely from the ferrules and the clamps do not obstruct the open end 56 of the ferrule. Only those clamps necessary to clearly illustrate operation of the device are shown in FIG. 1. The addition of more clamps would not serve any useful purpose and would unnecessarily clutter the drawing.

Referring to FIG. 2 the clamps consist of a movable jaw 57 and a fixed jaw 58. The arm 60 of the movable jaw passes through openings 62 in a guide 64 that is fixedly secured to the fixed jaw 58 so that the arm 60 may move back and forth through the guide to open and close the jaws 57 and 58. A jaw spring 66 is placed around the end portion of the jaw arm 60 extending through openings 62 in the guide 64. This spring is held between the jaw arm guide 64 and a washer 66 by a cotter pin 70 which holds the washer in position against the spring. The spring forces the washer away from the guide against the cotter pin 70 so that with the spring 66 in its expanded position the jaws 57 and 58 of the clamp are closed.

To hold the jaws open a catch 72 is provided. This catch is adapted to enter one of a number of indentations 74 in the jaw arm to hold jaws 57 and 58 open by keeping the jaw arm spring 66 compressed. The catch is pivotally mounted on the fixed jaw 58 of the clamp and extends through an opening 75 in the jaw arm guide to engage the indentations 74. The catch has a spring 76 which presses it against the movable jaw arm 60 so that as the jaws open, the catch rides along the surface of the movable jaw arm 60 following the indentations 74 therein. When the jaws start to close the spring 76 forces the catch into the first indentation it passes over preventing any further movement of the movable jaw 57. To release the catch a pressure plate 78 integral therewith compresses the catch spring 76 and pivots the catch 72 away from the movable jaw arm 60 out of the indentation 74 so the movable jaw arm slides freely through the guide holes 62 as the jaws are closed by the force of the jaw arm spring 66. When a ferrule is inserted into the clamp it contacts the pressure plate 78 causing the jaws 57 and 58 to close around the ferrule and hold it. A piece of elastomer tubing 80 is placed around the movable jaw to absorb the shock of the closing jaws so that the unglued bristles are not dislodged from the ferrule.

While the described form of clamp is especially adapted for use in carrying out the process of the present invention a conventional type of clamp may be employed. For example an ordinary spring clip may be used to grasp the exterior side wall of the ferrule.

After the ferrules are inserted into the clamps, each clamp 50 is carried by the continuous link chain 14 into the first station underneath a pump 82. The clamps each stop directly under the nozzle 84 of the pump, as a result of the stop motion of the conveyor chain 14, so the pump may dispense a measured amount of cement into each ferrule. The pump is preferably of the type described in my co-pending application Serial No. 48,005, filed August 8, 1960 for Proportioning Apparatus. This pump mixes, measures and dispenses in varying selected proportions two different viscosities of the resin and a catalyst for the resin. An adjustment in the pump permits an operator to change the viscosity of the cement by varying the proportions of the two different resins so that the penetration of the cement into the bristles may be controlled. In addition, the amount of cement dispensed into the ferrule is also controlled by an adjustment in the pump. Any conventional pump adapted for intermittent operation to deliver a measured shot of liquid cement may be employed such as for example described in United States Patent No. 2,895,644.

Any conventional liquid cement may be employed in the process of the present invention but the selected cement must be substantially free of solvents. This is important because as described hereinbelow the cement is cured and hardened after the handle is inserted into the top of the ferrule. As a result any appreciable expansion or contraction of the liquid cement caused by evaporation of solvent would tend to disrupt the assembly and interfere with the proper distribution of the cement for anchoring the bristle knot and handle in the ferrule. In those cases where a plastic handle such as polyethylene or synthetic bristles such as nylon are employed, the selected cement must be one that is capable of being cured and hardened at temperatures below the softening point of the plastic material in the brush and preferably the cement is one which will cure and harden at atmospheric temperature and pressure. Examples of liquid cements which have been employed with excellent results include the liquid epoxy resins, liquid phenolic resins, resorcinol aldehyde resins and polyester resins. All of these as well known in the art may be cured at atmospheric temperatures and pressures with a conventional catalyst employed for this purpose such as an amine.

In order to synchronize the dispensing of cement from pump 82 with movement of ferrules 54 a microswitch 86 which controls the pump 82 is positioned adjacent pin 36 in the intermittent drive mechanism 12. As a ferrule is moved into the first station under the nozzle of pump 82, the pin 36 contacts the micro-switch 86 which is thereby closed to actuate the pump which delivers a predetermined quantity of liquid cement into the ferrule on top of the bristle knot each time the switch is closed. Since there may not be a ferrule in each of the clamping positions on the conveyor a photosensitive switch 88 is positioned in the pumping station where the beam of light to the switch will be interrupted each time a ferrule is moved into position to receive a measured amount of liquid cement. The photosensitive switch 88 assures that the pump will only be actuated to dispense cement when a ferrule is positioned under the nozzle of the pump.

After the ferrules receive cement they are conveyed into the second station where handles are inserted into the ferrules. The insertion of handles may either be done by hand or by an automatic device described herein. As shown handles 94 are stored in a handle magazine 96 positioned above the continuous chain 14. The handles are forced toward one end 97 of the magazine 96 by a spring loaded plate 98. Suspended above end 97 of the magazine by any convenient means is a solenoid operated plunger 100. The solenoid of this plunger may be activated in the same manner as that employed for pump 82, that is an electric eye and micro-switch as shown at 88 and 86 respectively may be used in conjunction with the plunger to coordinate the dispensing of the handles 94 with the position of the ferrules 52. When a ferrule stops underneath the end 97 of the handle magazine 96, the electric eye and the micro-switch close the circuit between the solenoid of the plunger and the excitation for the solenoid. With the closing of the two switches the plunger forces a handle down through a hole in the magazine 96 and into the ferrule below the hole. Pressure exerted on the remaining handles by the spring loaded plate 98 moves the handles toward the end of the magazine to fill the void left by the handle that was forced through the hole.

When the handle is inserted into the ferrule a support (not shown) is preferably moved in under the ferrule to provide positive support. If such support is not employed the force of the plunger or the force exerted by the operator in putting the handles into the ferrules should not be too great because there is danger that the brush assembly may be dislodged from the clamp.

A preferred form of brush structure is made by using the hollow plastic handles disclosed in U.S. Patent No. 3,155,998, issued November 10, 1964, and titled "Brush Structure." It will be noted that in the preferred form of process a handle is inserted into a ferrule at the same time that a different ferrule receives a shot of cement.

With the handles in the ferrule the brush structure is now complete. However, it is still necessary that the cement harden to bind the bristles, handle and ferrule. If desired this may be done by letting the cement cure and harden at atmospheric pressure and temperature. However, we achieve a much more uniform structure and a higher rate of production by accelerating the cure with heat. For this purpose the brush is passed into a third station comprising a hood 102 where warm air is blown across the ferrules to heat them and accelerate hardening of the cement. As the brush moves along under hood 102 the warm air alternately passes across the ferrule in one direction and then in the other. This change in direction of air preferably occurs four times which insures even heating on both sides of the ferrule and an even cure of the resin. The air for this operation comes from a pump (not shown) and is transmitted to ducts 104 on the sides of the hood by pipes 106. The air passes over fin heaters 108 within the ducts, which heats the air as it passes over the fins.

When the brushes emerge from the hood the cement is hard and the finished brushes may be removed from the conveyor belt either by hand or automatically by mechanical means. The brush making cycle takes about ten minutes and finished brushes may be removed from the conveyor at rates up to forty brushes a minute. Since the brush may be completed in ten minutes, a test brush may be readily run through the brush making cycle and then examined to check the penetration of the cement into the bristle knot. Pump 82 may then be adjusted to deliver the proper viscosity of cement for the desired penetration and bond to the handle.

As for removing the completed brushes from the conveyor by mechanical means, a rod 110 is provided for releasing the ferrules from the jaws 57 and 58. The rod 110 contacts the extending end of the movable jaw arm 60 of the clamps 50 to compress the jaw arm spring 66 and open the jaws. As the spring is compressed the arm 60 moves relative to the jaw arm guide with the catch arm 72 riding freely over the indentations 74 in surface of the arm 60. After the release of the brush the rod 110 reverses its direction removing the force from the end of the jaw arm 60. The jaw arm 60 forced by the spring 66 tends to follow this movement until the catch 72 enters an indentation 74 whereupon the catch stops the motion of the arm, holding the jaws 57 and 58 open and the jaw arm spring 66 in compression. The jaws are opened sufficiently for the insertion of another ferrule so a new brush making cycle may be started. In this connection it should be understood that the opening of the jaws should not be excessive. If the jaws are opened excessively the force exerted by the clamping of the jaws to the ferrule will cause bristles to be jarred from the ferrule. The rest position of the rod 110 is adjustable to permit correct opening of the jaws for the size brush at hand.

To drive the rod 110 power is transmitted from the gear box 37 to a cam 114 attached to the output of the gear box 37. As the motor 38 rotates this cam 114 contracts an extending end 116 of a moment arm 118. This pivots the moment arm around pivot point 120 causing the arm to pivot back and forth in an arc around point 120 as the motor 38 rotates. A pin 122 riding in a slot 124 in the arm 118 transfers this motion to shaft 126 causing the shaft to oscillate back and forth along its longitudinal axis. The other end of the shaft 126 has gear teeth which mesh with a pinion gear 128, to transfer to the pinion gear the motion of the shaft 126. A second pinion gear 130 axially aligned with the first pinion gear 128 transmits the back and forth motion to the rod 110.

When the completed brush is released by the jaws it slides down a ramp 132 onto a conveyor belt 134 and is transported to bristle trimming areas. It will be noted that in the preferred process removal of the finished brush from the conveyor takes place simultaneously with the operations performed in the three stations described hereinabove.

To recapitulate, the electric motor 38 through intermittent drive 12 drives the continuous link chain 14 with a stop go motion around the sprockets 16 and 26. The clamps 50 that are attached along the length of the continuous link chain 14 move with the chain around the sprockets. As each clamp 50 passes rod 10 it stops in front of it and the rod contacts the end of the movable jaw arm 60 of the clamp forcing the jaws 57 and 58 open. When the force exerted by the rod 110 on the arm 60 is released the catch 72 enters one of the indentations 74 holding the jaws open. As the clamps continue to move along on the conveyor belt an operator inserts a ferrule 52 with the bristles 54 therein between the jaws of the clamp pressing the ferrule up against the touch sensitive plate 78 of the catch. This releases the catch causing the jaws 56 and 58 of the catch to clamp the ferrule between them.

With the ferrule in it each clamp stops under the pump 82 and therefore intercepts the light beam on the photocell 92. While the clamp is stopped under the pump, pin 36 contacts the roller arm of the micro-switch 86 to cause pump 82 to dispense a measured "shot" of cement into the ferrule.

The clamp is then carried by the conveyor belt under the handle plunger 100. The plunger drops a handle down into the ferrule. It should be pointed out at this time that some of the cement dispensed by the pump forms a pool on top of the bristles. The skirt of the handle enters this pool for the purpose of locking the handle to the ferrule. The amount of cement dispensed by the pump should be sufficient to leave enough cement on top of the bristles after the curing of the cement, to form a solid connection between the handle and the cement. In the above mentioned Patent No. 3,155,998 in one form of the handle disclosed therein the bottom edge of the skirt has holes in it into which the cement enters to form bridges that securely lock the handle in the ferrule when the cement hardens.

The assembled brush structure is then carried by the conveyor through hood 102 where warm air is blown across the ferrule to accelerate the cure of the cement. When the brush comes out of the heating hood 102, the cement is completely cured and the rod 110 in addition to setting the clamp for insertion of the brush releases the grip of the clamp on the completed brush so that the brush drops down on to the conveyor belt and is carried off.

It will be understood that it is intended to cover all changes and modifications of the preferred embodiment of the invention herein chosen for the purpose of illustration which do not constitute a departure from the spirit and scope of the invention.

I claim:
1. A continuous process for the manufacture of paint brushes of the type which include a ferrule, bristles and a handle united by a substantially solventless cement which comprises the steps of aligning a plurality of ferrule holders in tandem spaced relationship, holding ferrules with bristles therein in said ferrule holders in a manner which permits the bristles to hang freely from the ferrules, transporting said ferrule holders with a continuous intermittent motion into a plurality of stations, detecting the presence of a ferrule in a ferrule holder at one of said stations and providing a signal indicative thereof, admixing and dispensing in response to said signal a predetermined measured quantity of solventless cement into the detected ferrule atop the bristles therein, said cement comprising a reactive self-curing liquid of two or more components which in admixture remain curable for only a limited time at ambient temperatures, inserting handles into the cement-loaded ferrules at another of said stations so that a portion of the handles enters the liquid cement without dislodging the bristles, and curing the solventless cement while the bristles hang freely from the ferrules to lock together the handles, the bristles and the ferrules.

2. A continuous process for the manufacture of paint brushes of the type which include a ferrule, bristles and a handle united by a substantially solventless cement which comprises the steps of aligning a plurality of ferrule holders in tandem spaced relationship, holding ferrules with bristles therein in said ferrule holders in a manner which permits the bristles to hang freely from the ferrules, transporting said ferrule holders with a continuous intermittent motion into a plurality of stations and indicating by a signal the arrival of a ferrule holder at one of said stations, separately detecting the presence of a ferrule in the detected ferrule holder and providing a signal indicative thereof, admixing and dispensing in response to both said signals a predetermined measured quantity of solventless cement into the detected ferrule atop the bristles therein, said cement comprising a reactive self-curing liquid of two or more components which in admixture remain curable for only a limited time at ambient temperatures, inserting handles into the cement-loaded ferrules at another of said stations so that a portion of the handles enters the liquid cement without dislodging the bristles, and curing the solventless cement while the bristles hang freely from the ferrules to lock together the handles, the bristles and the ferrules.

3. The process of claim 2 wherein said solventless cement is an admixture of a high viscosity epoxy resin, a low viscosity epoxy resin and an amine catalyst therefor.

4. The process of claim 2 which includes the step of heating the ferrules at another of said stations to accelerate the curing of the solventless cement.

5. The method of manufacturing paint brushes of the type which include a ferrule, bristles and a handle united by a substantially solventless cement which comprises the steps of aligning a plurality of ferrule holders in tandem spaced relationship, holding a plurality of ferrules having bristles therein in said ferrule holders, feeding the ferrule holders wth a continuous intermittent motion in succession into a first station and indicating by a signal the arrival of each ferrule holder at said first station, separately detecting the presence of a ferrule in the detected ferrule holder and providing a signal indicative thereof, admixing and dispensing in response to both said signals a predetermined measured amount of solventless cement into the detected ferrule on top of the bristles therein at said first station, said cement comprising a reactive self-curing liquid of two or more components which in admixture remain curable for only a limited time at ambient temperatures, thereafter feeding the cement-loaded ferrule into a second station at the same time another ferrule is being fed into said first station, and then inserting a handle in the cement-loaded ferrule at said second station to complete the brush assembly.

6. The method of manufacturing paint brushes of the type which include a ferrule, bristles and a handle united by a substantially solventless cement which comprises aligning a plurality of ferrule holders in tandem spaced relationship, holding a plurality of ferrules having bristles therein in said ferrule holders, feeding the ferrule holders with a continuous intermittent motion in succession into a first station and indicating by a signal the arrival of each ferrule holder at said first station, separately detecting the presence of a ferrule in the detected ferrule holder and providing a signal indicative thereof, admixing and dispensing in response to both said signals a predetermined measured amount of solventless cement into the detected ferrule on top of the bristles therein at said first station, said cement comprising a reactive self-curing liquid of two or more components which in admixture remain curable for only a limited time at ambient temperatures, thereafter feeding the cement-loaded ferrule into a second station at the same time another ferrule is fed into said first station, and then inserting a handle into the cement-loaded ferrule at said second station at the same time that cement is dispensed into another ferrule at said first station.

References Cited by the Examiner
UNITED STATES PATENTS

| 2,164,244 | 6/1939 | Jung | 300—21 X |
| 2,854,684 | 10/1958 | Hardman et al. | 300—21 X |
| 3,008,193 | 11/1961 | Been | 300—21 X |

FOREIGN PATENTS

| 874,950 | 8/1961 | Great Britain. |

GRANVILLE Y. CUSTER, JR., *Primary Examiner.*